Sept. 8, 1964    J. W. GRAY    3,148,368
FALSE LOCK-ON ELIMINATION CIRCUIT
Filed Dec. 22, 1961

INVENTOR.
JOHN W. GRAY
BY
*H. I. Mackey*
ATTORNEY

United States Patent Office 3,148,368
Patented Sept. 8, 1964

3,148,368
FALSE LOCK-ON ELIMINATION CIRCUIT
John W. Gray, Pleasantville, N.Y., assignor to General Precision, Inc., a corporation of Delaware
Filed Dec. 22, 1961, Ser. No. 161,446
6 Claims. (Cl. 343—8)

This invention relates to Doppler air navigation radar systems and particularly to signal-to-noise detection circuits therefor.

Doppler radar navigation systems operate on and derive navigational information from a received echo signal spectrum which is broadband and which may change in frequency. Such systems, therefore, employ frequency-tracking components to track and lock to the received frequency spectrum and to find and measure the central spectrum frequency.

Such frequency-tracking circuits are described in U.S. Patent No. 2,915,748 and in an article entitled, The AN/APN-81 Doppler Navigation System, published in Transactions ANE-4 of the Institute of Radio Engineers, December 1957, pages 202–211.

A typical resonant frequency tracker contains a closed feedback loop containing at least a modulator, resonant filter, demodulator, integrator and oscillator. Accessory circuits include a sweep and flyback circuit for acquiring the Doppler signal and a signal-to-noise detector to measure the ratio of signal to noise and to control thereby the operation of the sweep and flyback circuit.

The sweep and flyback circuit acquires the signal by causing the oscillator to sweep or change in frequency, slowly, from the high end of its range at perhaps 27 k.c.p.s. to the low end, at perhaps 1.3 k.c.p.s. This sweep, occupying perhaps 100 seconds, will by heterodyne action in the modulator produce an output signal through the following filter if the input to the modulator contains a Doppler signal. However, if in addition to the Doppler signal fundamental frequency its second harmonic is also present, the sweep will encounter it before encountering the fundamental, and if the second harmonic is strong the oscillator will lock to it instead of to the fundamental.

Doppler air navigation systems employing the "Janus" principle simultaneously emit two beams of transmitted energy at different angles. The echoes received from these two beams are mixed and intermodulated to secure a signal containing the Doppler frequency difference information. This process also inherently generates harmonics of the fundamental Doppler frequency difference, of which the second harmonic is the strongest, and as a practical matter is the only harmonic which is strong enough to cause malfunction during signal acquisition.

The present circuit eliminates this possibility of locking to the second harmonic of the Doppler signal. The circuit does this by selecting, as noise input to the signal-to-noise circuit, a frequency sample from the random noise spectrum having at all times one-half of the oscillator frequency. This prevents any possibility, during the search sweeping, of locking to the second harmonic of a Doppler signal.

A further understanding of this invention may be secured from the detailed description and the associated drawings, in which.

Figure 1:
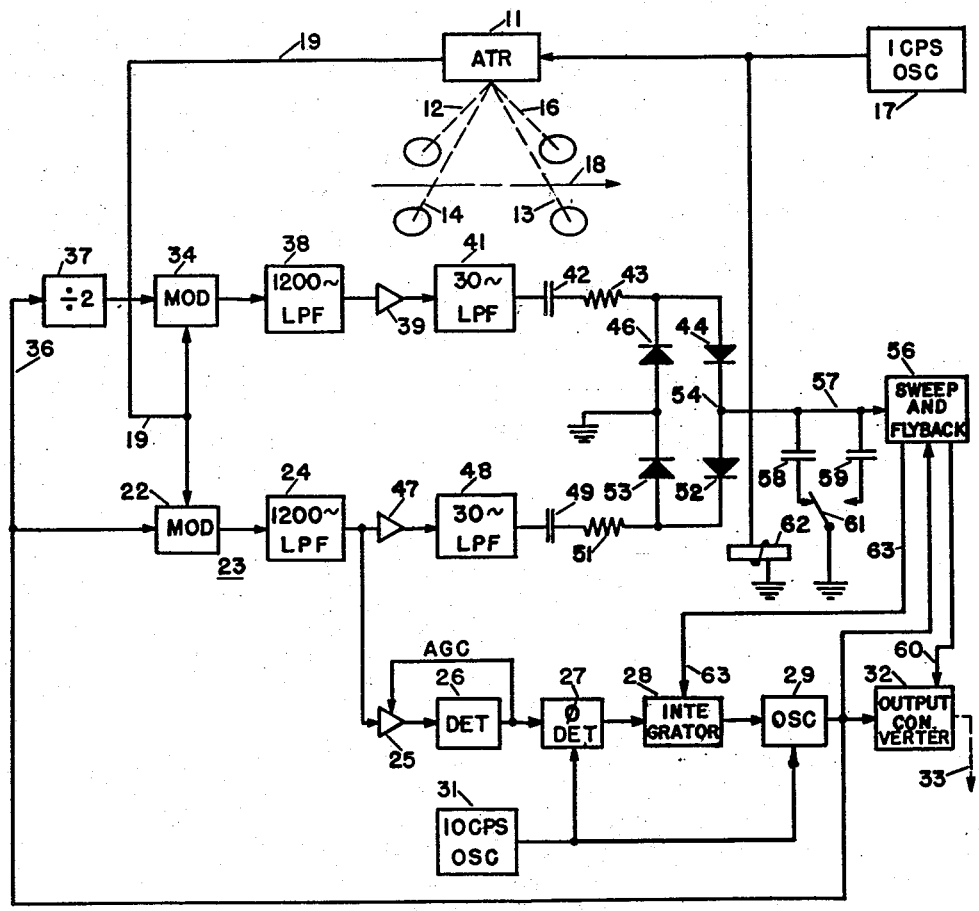
FIGURE 1 is a schematic drawing of an embodiment of the invention.
Figure 2:
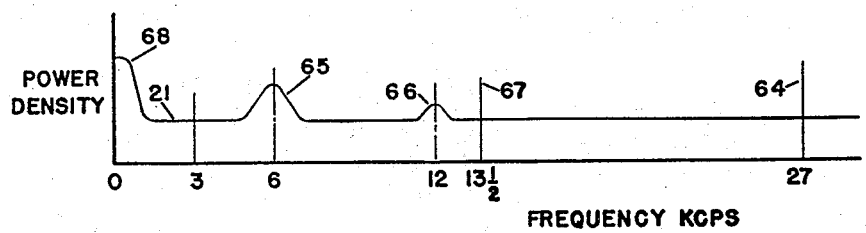
FIGURE 2 is a graph explaining the operation of the invention.

Referring now to FIGURE 1, a Doppler navigation system carried by an aircraft includes a microwave component 11 containing an antenna, transmitter and receiver. It emits two beams, 12 and 13, simultaneously, which are cyclically switched by the generator 17 to the positions indicated at 14 and 16 at a rate of one cycle per second. Thus at any instant echoes are received from ahead of and behind the aircraft and from either side of the ground track 18. The output signal of the microwave receiver on conductor 19 consists of Doppler frequency information components, with their harmonics, and wide-band noise. The Doppler fundamental spectrum has a center frequency which may lie in the wavelength range between 27 kc.p.s. and 1.3 kc.p.s. Random noise is to be found within this range and beyond, with increased noise usually found near zero frequency. A typical curve of power density variation with frequency is shown in FIGURE 2, in which a fundamental Doppler spectrum is shown at 6 kc.p.s., the second harmonic of the same signal at 12 kc.p.s., and a large amount of noise below 1½ kc.p.s., At all frequencies a background of noise is indicated at the level 21.

In FIGURE 1, the conductor 19 constitutes one input of a modulator 22 forming one component of a frequency tracker loop 23. This loop also contains a low-pass filter 24 having an upper limit of 1200 c.p.s., an amplifier 25 for automatic gain control signal amplification, a detector 26, a 10 c.p.s. phase detector 27, an integrator 28, and an oscillator 29 having a rang of 1.3 to 27 kc.p.s. A 10 c.p.s. generator 31 frequency modulates the oscillator 29 and, by providing a frequency reference to the phase detector 27, secures synchronous demodulation of the 10 c.p.s. component applied to the detector.

The frequency tracker output is taken from the output of oscillator 29 through an output converter 32, which may include a servomechanism. This circuit converts the oscillator frequency to an angular deflection of shaft 33 representing that frequency.

A noise branch secures its input from conductor 19, which is connected to a modulator 34. The modulator 34 secures its modulating signal from the oscillator 29 through conductor 36 and a circuit 37 which divides the oscillator frequency by two. This divider circuit 37 may consist of a conventional scale-of-two or bistable multivibrator. The modulator 34 is followed by a low-pass filter 38 similar to filter 24 and by an amplifier 39. The amplifier 39 is followed by another low-pass filter 41, which has an upper cutoff at 30 c.p.s. so that it transmits only in the frequency band at zero to 30 cycles per second. The noise branch output derived from amplifier 39 is coupled through a capacitor 42 to a differential detector or subtracting circuit including a resistor 43 and liodes 44 and 46.

The differential detector or subtracting circuit is also supplied with input from the frequency tracker loop 23. This input is derived from the output of low pass filter 24 through an amplifier 47 identical to amplifier 39. Amplifier 47 is followed by a low-pass filter 48 having a 30 c.p.s. cutoff and is identical to filter 41. The output of the filter 48 is coupled through a capacitor 49 to a differential detector which includes resistor 51 and diodes 52 and 53. The other sides of diodes 46 and 53 are grounded and the other sides of diodes 44 and 52 are joined at a junction 54.

A sweep and flyback circuit 56 is provided to change the system from normal operation to its sweep and memory mode when the Doppler signal fails, and to restore to normal operation when a Doppler signal is again found.

Such a sweep and flyback circuit is described in U.S. patent application Serial No. 77,570, filed December 22, 1960 now Patent Number 3,039,063.

The sweep and flyback circuit 56 has its input connected so as to be operated by the signals present at junction 54 applied through conductor 57. These signals indicate signal strength above or below threshold value. In order to secure different signals from the right and left antenna beams when they strike the earth of different distances from the ground track because of misalignment of the antenna with the ground track, two capacitors 58 and 59 are provided. A switch arm 61 is connected to ground either capacitor. The switch arm 61 is operated by a relay coil 62 from the one-c.p.s. oscillator 17. Thus the capacitors 58 and 59 are alternately employed in synchronism with the right-left beam rate.

Briefly, the sweep and flyback circuit 56 is set into operation by a positive signal derived from junction 54, indicating a preponderance of noise over Doppler signal. The sweep and flyback circuit then, through conductor 60, locks the output signal shaft 33 and through conductor 63 connects the output of the integrator 28 to its input, causing its output voltage to drop exponentially, which causes the oscillator 29 output frequency to sweep slowly from its upper limit to its lower limit. At the latter limit, a frequency-sensing element in the sweep and flyback circuit 56 applies negative potential to the integrator 28, causing its output voltage to increase abruptly and causing the oscillator 29 output frequency to fly back to its upper limit. This cycle is then repeated.

The sweep and flyback circuit 56 sweeping operation is interrupted when and if a negative signal preponderates at junction 54, indicating the presence of a Doppler signal stronger than the noise signal. The sweep and flyback circuit is thereby disabled, the integrator 28 is restored to normal operation on frequency tracker signals, and the output shaft 33 operation is restored.

Proper operation of the signal-to-noise circuit requires that the amplifiers 39 and 47 be alike, and that the other components in the noise and signal branches following these amplifiers be alike. Proper operation is also dependent to some extent on having approximately equal gains in these two branches, which is insured, at low signal levels, by confining the signals in both branches, by the filters 41 and 48, to the 0–30 c.p.s. band.

In the operation of the entire signal-to-noise circuit, let it be supposed that oscillator is starting a downward sweep from about 28 kc.p.s. and has arrived at 27 kc.p.s. The oscillator output having the average of its modulated frequency at 27 kc.p.s. is indicated in FIGURE 2 by the line 64. This is applied to the modulator 22, FIGURE 1. Let it be supposed that a Doppler signal spectrum 65 having a central fundamental frequency of 6 kc.p.s. is applied by conductor 19 to the modulator 22. The signal's second harmonic, 66, at 12 kc.p.s. will also be present.

The oscillator output is also applied to the scale-of-two circuit 37, which halves the oscillator frequency and applies it to the noise branch modulator 34. This frequency is indicated in FIGURE 2 by the line 67. As the oscillator frequency decreases, the line 64 moves downward, the line 67 also moving downward, and being at all times, one-half of the frequency of line 64. When line 67 arrives at the second harmonic, 66, a heterodyne output centered near zero frequency is applied from modulator 34 to filter 38, is amplified, filtered in 30 c.p.s. filter 41, and applied to the differential detector diodes 44 and 46, resulting in a positive potential at output junction 54 proportional to the second harmonic magnitude. At the same time the oscillator frequency 64 encounters only background noise, resulting in a smaller signal applied to the detector diodes 52 and 53. Their negative potential output is less than the positive potential output at junction 54, so that the net direct potential applied to the sweep and flyback circuit 56 is positive. This permits this circuit to continue sweeping.

As the oscillator frequency continues to move downward, the half-frequency 67 encounters the signal fundamental 65 at the same time that the oscillator frequency 64 encounters the smaller second harmonic amplitude 66. The positive noise signal at junction 54 therefore remains larger than the negative information signal, and the net positive signal again permits the sweep and flyback circuit to continue sweeping.

When the oscillator frequency 64 arrives at 6 kc.p.s. a strong information signal is applied to the differential detector diodes 52 and 53, resulting in a strong negative signal at junction 54. At the same time, the half-frequency signal 67 is at 3 kc.p.s., so that only a weak background noise signal is applied to the noise branch. The output to the sweep and flyback circuit is therefore negative, which causes it to stop the oscillator sweep. The oscillator then being connected in the tracker loop 23, thereafter tracks the fundamental of the Doppler signal under control of the integrating circuit 28.

If for any reason the oscillator frequency 64 should fail to stop at the fundamental spectrum 65, or the sweep-down operation should start below the fundamental frequency, the half-frequency signal 67 would encounter the large noise signal 68 near zero frequency, while the oscillator output frequency signal 64 would encounter only background noise. In this case also, therefore, false lock-on could not occur and the sweep and flyback operation would continue.

What is claimed is:

1. A false lock-on elimination circuit in a Doppler radar system comprising, an antenna-receiver-transmitter, a signal branch, a noise branch, means applying the receiver output of said antenna-receiver-transmitter to both said signal branch and said noise branch, an oscillator connected to heterodyne modulate the signal in said signal branch, means dividing the frequency of said oscillator by two, circuit means connecting said last-named means to said noise branch to heterodyne modulate the noise signal therein, a subtracting circuit connected for operation from both said signal branch and said noise branch, sweep and flyback means for controlling said oscillator in accordance with the ratio of signal to noise, and circuit means controlling said sweep and flyback means from said subtracting circuit.

2. A false lock-on elimination circuit comprising, a Doppler radar system having an output signal spectrum, a frequency tracker loop, a noise branch, means applying said output signal spectrum to said frequency tracker loop and to said noise branch, an oscillator in said frequency tracker loop, means halving the frequency of said oscillator, means applying the halved oscillator frequency to said noise branch, a differential detector having its input terminals connected to said frequency tracker loop and to said noise branch, and a sweep and flyback circuit controlling transitions between sweep and normal modes of said oscillator, said sweep and flyback circuit being connected to the output of said differential detector for operation thereby.

3. A false lock-on elimination circuit comprising, a Doppler radar system having an output signal including a Doppler signal and noise signal, said Doppler signal having at least fundamental and second harmonic frequencies, a frequency tracker loop including an oscillator having sweep and normal modes of operation, sweep and flyback means controlling the transitions of said oscillator between sweep and normal modes, a noise branch including a modulator, means applying said output signal to both said frequency tracker loop and said modulator, scale-of-two means for halving the frequency of an applied signal to form a half-frequency output signal, means energizing said scale-of-two means from the output of said oscillator, means applying said half-frequency signal to said modulator as heterodyning input, a first amplifier energized by said frequency tracker loop, a second amplifier in said noise branch, said first and second amplifiers being identical in characteristics, and a differential detector having its input terminals connected to the outputs of said two identical amplifiers and having its output terminal connected to said sweep and flyback means for the control thereof.

4. A false lock-on elimination circuit comprising, a Doppler radar system having an output signal including a Doppler signal fundamental spectrum centered at a selected frequency, and noise at all frequencies, said Doppler signal fundamental spectrum having associated with it the second harmonic spectrum thereof of less amplitude than the fundamental spectrum amplitude, a frequency tracker loop including a modulator, an integrator and an oscillator, said oscillator being controlled by said integrator to operate in either normal or sweep mode, a noise branch including a modulator, a scale-of-two circuit energized from said oscillator and emitting a half-frequency signal, means applying the output signal of said Doppler radar system to said frequency tracker modulator and said noise branch modulator, means in said frequency tracker applying said oscillator output to said frequency tracker modulator to heterodyne modulate the Doppler system output signal applied thereto resulting in a selected first difference signal, a frequency tracker loop branch receiving said first difference signal from said frequency tracker loop, means applying said half-frequency signal to said noise branch modulator to heterodyne modulate the Doppler system output signal applied thereto resulting in a selected second difference signal, differential detector means subtracting the outputs of said noise branch and said frequency tracker loop branch to produce a differential signal having polarity signifying the input signal of superior amplitude, a sweep and flyback circuit having said differential signal impressed thereon, means controlling said integrator from said sweep and flyback circuit means operating said integrator from said sweep and flyback circuit to cause said integrator to apply a continuously decreasing signal to said oscillator causing it to sweep down in frequency when the differential signal impressed on said sweep and flyback circuit has a polarity indicative of a predominance of noise signal.

5. A false lock-on elimination circuit comprising, a Doppler radar receiver having an output signal including the fundamental and second harmonic of a Doppler spectrum signal centered at a selected frequency and noise signal at all frequencies, said second harmonic being of less amplitude than said fundamental, a frequency tracker closed loop including a modulator, filter, integrator and local oscillator, said local oscillator being controlled by said integrator to operate in either a normal mode or a sweep mode, a noise branch including a modulator and filter, means applying said receiver output signal to both said modulators, frequency-dividing circuit means halving the frequency of said local oscillator, means applying said halved frequency signal to said noise branch modulator, a subtracting circuit receiving the outputs of said noise filter and said closed loop filter as minuend and subtrahend and emitting a difference signal, an output circuit connected to said local oscillator, a sweep and flyback circuit controlling said output circuit and said integrator to cause said oscillator in its sweep mode to sweep down, and means applying said difference signal to control said sweep and flyback circuit whereby in sweeping the frequency tracker closed loop will never at any intensity of signal lock to said second harmonic signal.

6. A false lock-on elimination circuit comprising, a signal branch, a noise branch, a local oscillator, first modulator means interposed in the input of said signal branch having the output of a receiver and the output of said oscillator impressed thereon, second modulator means interposed in the input of said noise branch and having the output of said receiver and a half-frequency output of said oscillator impressed thereon, control means connected to said oscillator and acting in a first condition of operation to sweep the oscillator output signal frequency over a selected range and acting in a second condition of operation to cause the oscillator output signal frequency to be maintained at a selected value determined by the signal frequency of the output of said receiver, means connected to the output of said signal branch and said noise branch for producing a signal of one sense when the output of said noise branch preponderates over the output of said signal branch and producing a signal of opposite sense when the output of said signal branch preponderates over the output of said noise branch, and means operated by said signal in its one sense for maintaining said control means in its first condition of operation and operated by said signal in its opposite sense for maintaining said control means in its second condition of operation.

No references cited.